(12) United States Patent
Krishnan et al.

(10) Patent No.: US 11,847,044 B2
(45) Date of Patent: Dec. 19, 2023

(54) ALIAS ANALYSIS USING LABELLED ACCESS PATHS

(71) Applicant: Oracle International Corporation, Redwood Shores, CA (US)

(72) Inventors: Padmanabhan Krishnan, Brisbane (AU); Yang Zhao, St. Lucia (AU)

(73) Assignee: Oracle International Corporation, Redwood Shores, CA (US)

( * ) Notice: Subject to any disclaimer, the term of this patent is extended or adjusted under 35 U.S.C. 154(b) by 45 days.

(21) Appl. No.: 17/469,713

(22) Filed: Sep. 8, 2021

(65) Prior Publication Data

US 2023/0072019 A1    Mar. 9, 2023

(51) Int. Cl.
G06F 9/30     (2018.01)
G06F 11/36    (2006.01)

(52) U.S. Cl.
CPC ...... G06F 11/3688 (2013.01); G06F 9/30043 (2013.01)

(58) Field of Classification Search
CPC .......................... G06F 11/3688; G06F 9/30043
See application file for complete search history.

(56) References Cited

U.S. PATENT DOCUMENTS

| | | | | |
|---|---|---|---|---|
| 8,429,636 B2 * | 4/2013 | Chou | ................. | G06F 9/30032 712/216 |
| 2002/0166115 A1 * | 11/2002 | Sastry | ..................... | G06F 8/441 717/151 |
| 2012/0072988 A1 * | 3/2012 | Agrawal | ............... | G06F 21/563 726/24 |
| 2012/0254830 A1 * | 10/2012 | Conrad | ............... | G06F 11/3604 717/106 |
| 2013/0055221 A1 * | 2/2013 | Murthy | ............... | G06F 11/3608 717/132 |
| 2017/0195361 A1 * | 7/2017 | Liu | ........................... | G06F 8/41 |
| 2018/0211046 A1 * | 7/2018 | Muttik | ............... | G06F 9/30058 |

(Continued)

OTHER PUBLICATIONS

F. Ohata, et al, "Jaat: Java Analysis Tool for Program Maintenance Aactivities", In IEEE International Symposium on Object and Component-Oriented Real-Time Distributed Computing (ISORC), Jan. 1, 2006, 37 pages.

(Continued)

*Primary Examiner* — Jae U Jeon
(74) *Attorney, Agent, or Firm* — Ferguson Braswell Fraser Kubasta PC

(57) ABSTRACT

A method may include detecting a first sub-flow, by executing a local defect analysis on code starting at a sink instruction, to a load instruction performing reading a first value using a first variable. The first sub-flow may include a first label of a first defect. The method may further include detecting a second sub-flow, by executing the local defect analysis on the code starting at a store instruction, to a load instruction performing writing a second value using a second variable. The second sub-flow may include a second label of a second defect. The method may further include determining that the first variable and the second variable are potential aliases by determining that the first label matches the second label, and obtaining, based on determining that the first variable and the second variable are potential aliases, a nonlocal flow by connecting the first sub-flow and the second sub-flow.

15 Claims, 7 Drawing Sheets

(56) References Cited

U.S. PATENT DOCUMENTS

2020/0057856 A1\* 2/2020 Daymont ............ G06F 11/3612
2020/0265143 A1\* 8/2020 Kagalavadi Ramesh ....................
                                                          G06F 21/563

OTHER PUBLICATIONS

J. Lerch, et al., "Access-path Abstraction: Scaling Field-Sensitive Data-flow Analysis with Unbounded Access Paths", In Automated Software Engineering, Nov. 9-13, 2015, 11 pages.

O. Tripp, et al., "TAJ: Effective Taint Analysis of Web Applications", In PLDI, Jan. 1, 2009, 11 pages.

Antoniadis, A., et al., "Static Analysis of Java Enterprise Applications: Frameworks and Caches, The Elephants in the Room", In Proceedings of the 41st ACM SIGPLAN Conference on Programming Language Design and Implementation, Jun. 15-20, 2020, 14 pages.

J. Vedurada, et al., "Batch Alias Analysis", In Automated Software Engineering, Nov. 10, 2019, 13 pages.

\* cited by examiner

ALIAS ANALYSIS USING LABELLED ACCESS PATHS

BACKGROUND

Code analysis techniques such as taint analysis often require precise alias information. Various security analyses such as code injection analysis, often rely on taint analysis. A taint analysis determines if the value at any given location is tainted (e.g., controllable by a potential attacker). A taint analysis typically performs a points-to analysis to determine which objects a variable may point to during program execution, and whether different variables alias (i.e., whether the different variables may refer to the same object). However, alias analysis is computationally expensive because the different variables may be in different functions, necessitating a global analysis of the codebase.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for executing a nonlocal defect analysis on code including detecting a first sub-flow, by executing a local defect analysis on the code starting at a sink instruction, to a load instruction performing reading a first value using a first variable. The first sub-flow includes a first label of a first defect. The method further includes detecting a second sub-flow, by executing the local defect analysis on the code starting at a store instruction, to a load instruction performing writing a second value using a second variable. The second sub-flow includes a second label of a second defect. The method further includes determining that the first variable and the second variable are potential aliases by determining that the first label matches the second label, and obtaining, based on determining that the first variable and the second variable are potential aliases, a nonlocal flow by connecting the first sub-flow and the second sub-flow.

In general, in one aspect, one or more embodiments relate to a system for executing a nonlocal defect analysis on code including a computer processor and a repository configured to store the code including a sink instruction, a source instruction, a load instruction performing reading a first value using a first variable, and a store instruction performing writing a second value using a second variable. The system further includes a nonlocal flow detector executing on the computer processor and configured to: detect a first sub-flow to the load instruction by executing a local defect analysis on the code starting at the sink instruction. The first sub-flow includes a first label of a first defect. The nonlocal flow detector is further configured to detect a second sub-flow to the source instruction by executing the local defect analysis on the code starting at the store instruction. The second sub-flow includes a second label of a second defect. The nonlocal flow detector is further configured to determine that the first variable and the second variable are potential aliases by determining that the first label matches the second label, and obtain, based on determining that the first variable and the second variable are potential aliases, a nonlocal flow by connecting the first sub-flow and the second sub-flow.

In general, in one aspect, one or more embodiments relate to a method for executing a nonlocal defect analysis on code including sending the code to a nonlocal flow detector configured to perform: detecting a first sub-flow, by executing a local defect analysis on the code starting at a sink instruction, to a load instruction performing reading a first value using a first variable. The first sub-flow includes a first label of a first defect. The nonlocal flow detector is further configured to perform: detecting a second sub-flow, by executing the local defect analysis on the code starting at a store instruction, to a load instruction performing writing a second value using a second variable. The second sub-flow includes a second label of a second defect. The nonlocal flow detector is further configured to perform: determining that the first variable and the second variable are potential aliases by determining that the first label matches the second label, obtaining, based on determining that the first variable and the second variable are potential aliases, a nonlocal flow by connecting the first sub-flow and the second sub-flow, generating a report describing the first defect and the nonlocal flow, and transmitting the report describing the first defect and the nonlocal flow. The method further includes receiving, from the nonlocal flow detector, the report describing the first defect and the nonlocal flow.

Other aspects of the invention will be apparent from the following description and the appended claims.

DETAILED DESCRIPTION

Figure 1A:
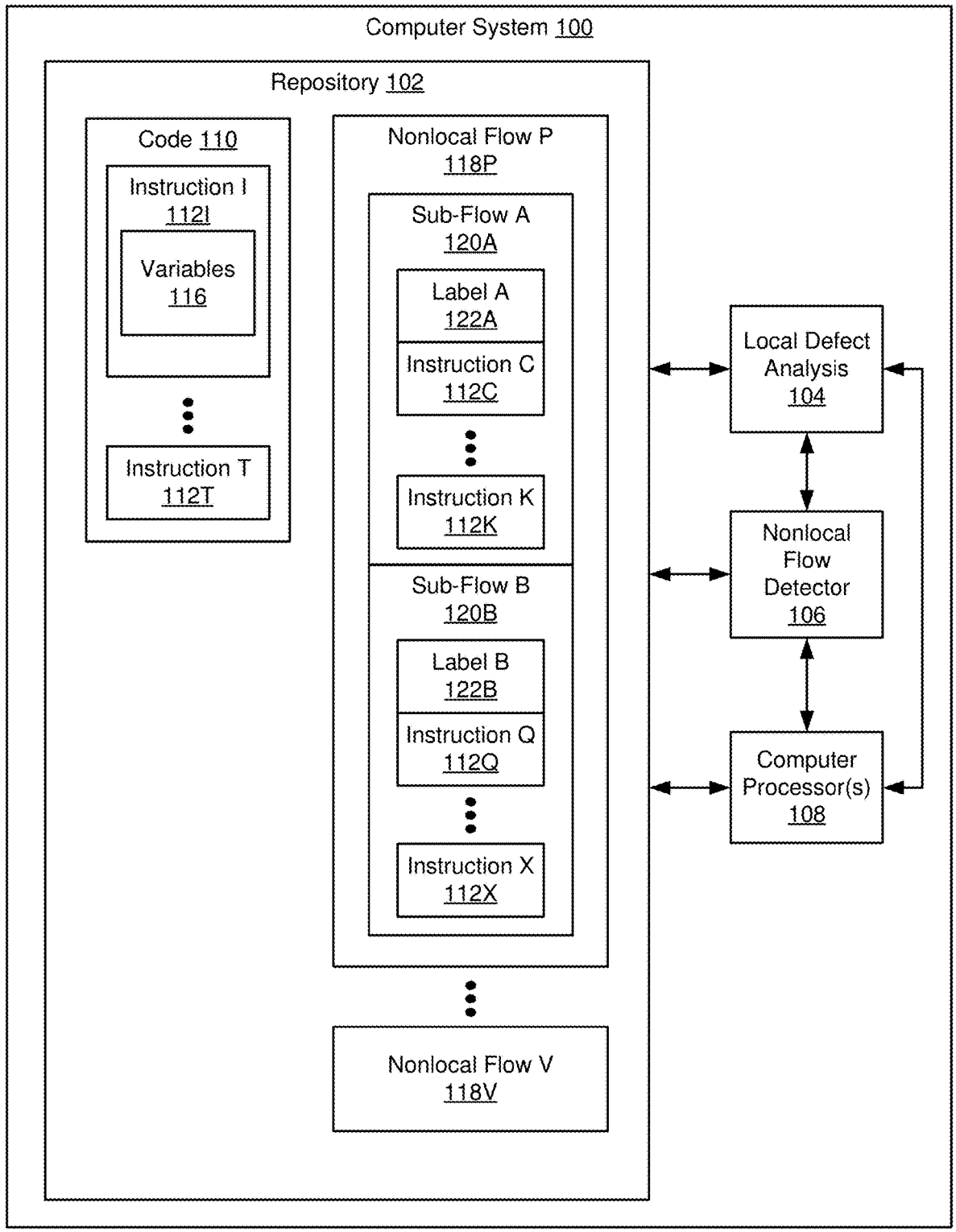
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to detecting nonlocal defect flows in code. A sub-flow is detected to a load instruction by executing a local defect analysis on the code starting at a sink instruction. The sink instruction may perform a security-sensitive operation. The load instruction may read a value from a nonlocally accessible data structure (e.g., a database) using a variable. The local defect analysis may detect the sub-flow by propagating access paths to a series of instructions starting at the sink instruction until the load instruction is reached. The sub-flow and each access path include a label of a defect. For example, if the local defect analysis is a taint analysis, the defect may be "code injection" or "cross-site scripting." Another sub-flow to a source instruction is detected by executing the local defect analysis on the code starting at a store instruction. The store instruction may write another value to the nonlocally accessible data structure using another variable. The source instruction may receive a potentially defective value (e.g., tainted data). The other sub-flow includes another label of a defect.

It may be determined that the variable and the other variable are potential aliases by determining that the label matches the other label. Two variables are aliases of each other when the two variables may refer to the same value. Thus, a potentially defective value may flow from the store instruction to the load instruction via the aliased variables.

A nonlocal flow is then obtained by connecting the sub-flow and the other sub-flow. For example, the nonlocal flow may include both the sub-flow and the other sub-flow, where the load instruction of the sub-flow follows the store instruction of the other sub-flow.

Determining that that the variable and the other variable are potential aliases by matching labels is an efficient technique for performing an approximate alias analysis. For example, limiting the nonlocal analysis to sub-flows whose access paths have matching labels reduces the computational complexity of the nonlocal defect analysis. In addition, by excluding sub-flows whose labels fail to match, the precision of the nonlocal analysis is improved. In contrast, a complete nonlocal alias analysis is computationally expensive, and unscalable to large codebases.

FIG. 1A shows a computer system (100) in accordance with one or more embodiments of the invention. As shown in FIG. 1A, the computer system (100) includes a repository (102), a local defect analysis (104), a nonlocal flow detector (106), and computer processor(s) (108). In one or more embodiments, the computer system (100) takes the form of the computing system (500) described with respect to FIG. 5A and the accompanying description below or take the form of the client device (526) described with respect to FIG. 5B.

In one or more embodiments, the repository (102) is any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site. The repository (102) may be accessed online via a cloud service (e.g., Oracle Cloud, Amazon Web Services, Egnyte, Azure, etc.).

In one or more embodiments, the repository (102) includes functionality to store code (110) and nonlocal flows (118P, 118V). The code (110) is a collection of instructions (112I, 112T). An instruction (112I) is a statement written in a human-readable programming language, or intermediate representation (e.g., byte code).

An instruction (112I) includes one or more variables (116). A variable (116) may reference a location in the code (110) where a value (e.g., an object) is stored, such as an allocation site. An allocation site may be an instruction (112I) in the code (110) that declares, instantiates, and/or initializes an object. A variable (116) may refer to a simple allocation site (e.g., a numerical or string value), may refer to a complex allocation site (e.g., an object or structure containing one or more fields), or may refer to a field in a complex allocation site. The allocation site may contain different values at different points in time. In one or more embodiments, the allocation site may refer to a location in a memory (e.g., in non-persistent storage (504) or persistent storage (506) of FIG. 5A) of the computer system (100) that is allocated when a function is invoked at an entry point of the code (110). The location in the memory may be freed when the function invoked at the entry point terminates. A variable (116) may reference an attribute of an object that is defined external to the code (110). For example, a variable (116) may reference a value in a data structure (e.g., a database) that persists beyond the invocations of functions at various entry points of the code (110).

The local defect analysis (104) includes functionality to detect local flows in the code (110). A local flow is an execution path including a sequence of instructions that starts at a source instruction and ends at a sink instruction. A source instruction may receive a potentially defective value. For example, if the local defect analysis (104) is a taint analysis, then the source instruction may receive potentially tainted data. Continuing this example, the potentially tainted data may be received from a source external to the code (110), such as a user or other code external to the code (110). As another example, if the local defect analysis (104) is a weak cryptographic analysis, then the source instruction may receive constant data (e.g., a hardcoded encryption key, algorithm identifier, or password that has become out-of-date).

A sink instruction may use the potentially defective value. For example, the sink instruction may perform a security-sensitive operation, such as accessing a security-sensitive resource of the computer system (100). Alternatively, the security-sensitive operation may be an operation that executes an arbitrary string as a command, such as an eval instruction. As another example, if the local defect analysis (104) is a weak cryptographic analysis, then the sink instruction may generate an encrypted signature using the potentially defective value.

The local defect analysis (104) may specify one or more modifier instructions that modify potentially defective data to render the potentially defective data harmless. For example, if the local defect analysis (104) is a taint analysis, a modifier instruction may be a sanitizer that transforms a potentially tainted value into a safe (e.g., trusted) value that is not associated with a taint flow. Continuing this example, a sanitizer may modify a value by encoding or replacing potentially dangerous characters with harmless equivalents. Further continuing this example, the potentially dangerous characters may be filtered or escaped.

The local defect analysis (104) may specify a defect corresponding to potentially defective data received by a source instruction and/or used by a sink instruction. For example, if the local defect analysis (104) is a taint analysis, the defect at the source instruction may be "tainted data" and the defect at the sink instruction may be "code injection" or "cross-site scripting." As another example, if the local defect analysis (104) is a weak cryptographic analysis, the defect at the source instruction may be "hardcoded data" and the defect at the sink instruction may be "compromised signature."

Figure 1B:
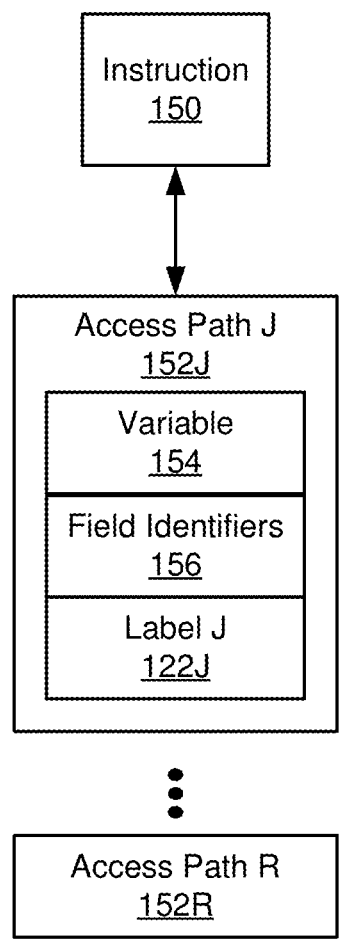

In one or more embodiments, the local defect analysis (104) uses the Interprocedural Finite Distributive and Subset (IFDS) approach that propagates access paths at a series of program points (e.g., instructions (112I, 112T)) of the code (110). Turning to FIG. 1B, an instruction (150) corresponds to one or more access paths (152J, 152R). An access path (152J) includes a variable (154), a sequence one or more field identifiers (156), and a label (122J). The field identifiers (156) refer to fields within an object referenced by the variable (154). The variable (154) may be a local variable of the code (110). For example, the variable (154) may be a local variable of a function in the code (110) that includes the instruction (150). Alternatively, the variable (154) may be a local variable of another function in the code (110) that invokes the function that includes the instruction (150). An access path (152J) may be written as $b.f_1.f_2 \ldots f_n$., where the variable (154) is b and the field identifiers (156) are $f_1$. $f_2 \ldots f_n$. The variable (154) may identify an instance of an object. The field identifiers (156) of the access path (152J) may identify and/or access data within the object starting from the variable (154). The label (122J) indicates a defect corresponding to a value accessed via the access path (152J).

Returning to FIG. 1A, a nonlocal flow (118P) includes sub-flows (120A, 120B). The sub-flows (120A, 120B) include flows of values among instructions ((112C, 112K), (112Q, 112X)) of the code (110). For example, sub-flow A (120A) may start at a source instruction and end at a store instruction. The store instruction may write, using a variable, a potentially defective value that was received by the source instruction. The store instruction may write the potentially defective value into a nonlocally accessible data structure. For example, the nonlocally accessible data structure may be a database or any other data structure that is accessible (e.g., modifiable) by other code external to the code (110). The store instruction may be any instruction that deposits a value into a nonlocally accessible data structure. For example, the store instruction may be the Structure Query Language (SQL) INSERT instruction, or a wrapper function that includes another instruction that deposits a value into the nonlocally accessible data structure.

Sub-flow B (120B) may start at a load instruction and end at a sink instruction. The load instruction may read, using another variable, the potentially defective value that was written by the store instruction. The load instruction may read the potentially defective value from the nonlocally accessible data structure. The load instruction may be any instruction that retrieves a value from a nonlocally accessible data structure. For example, the load instruction may be the Structure Query Language (SQL) LOAD instruction, or a wrapper function that includes another instruction that retrieves a value from the nonlocally accessible data structure.

In one or more embodiments, the variable used by the store instruction to write the potentially defective value and the other variable used by the load instruction to read the potentially defective value are aliases of each another. Two variables are aliases of each other when the two variables may refer to the same value (e.g., the potentially defective value in the nonlocally accessible data structure).

The sub-flows (120A, 120B) includes labels (122A, 122B). Continuing the above example, sub-flow A (120A) may include label A (122A) of a defect corresponding to the source instruction. Further continuing the above example, label A (122A) may be "tainted data." Similarly, sub-flow B (120B) may include B (122B) of a defect corresponding to the sink instruction. For example, label B (122B) may be "code injection" or "cross-site scripting," depending on a specific defect that may occur at the sink instruction. In one or more embodiments, a defect map (not shown) is used to map a defect to another defect. For example, the defect "tainted data" may be mapped to the defects "code injection" and/or "cross-site scripting." That is, receiving tainted data at a source instruction may manifest as a code injection cross-site scripting defect at the sink instruction. The defect map may be used in determining whether one label matches another label.

The nonlocal flow detector (106) includes functionality to detect nonlocal flows (118P, 118V) by performing an alias analysis. The nonlocal flow detector (106) includes functionality to execute the local defect analysis to detect sub-flows (120A, 120B).

The nonlocal flow detector (106) includes functionality to receive the code (110), directly or indirectly, from a user and to transmit a report including a defect and a nonlocal flow (118P), directly or indirectly, to a user. For example, the user may display the report in a graphical user interface (GUI) of a user computing system. In one or more embodiments, the user computing system provides, to a user, a variety of computing functionality. For example, the computing functionality may include word processing, multimedia processing, financial management, business management, social network connectivity, network management, and/or various other functions that a computing device performs for a user.

The user computing system may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system may take the form of the computing system (500) shown in FIG. 5A connected to a network (520) as shown in FIG. 5B. The GUI of the user computing system may be rendered and displayed within a local desktop software application or the GUI may be generated by a remote web server and transmitted to a user's web browser executing locally on a desktop or mobile device.

In one or more embodiments, the computer processor(s) (108) takes the form of the computer processor(s) (502) described with respect to FIG. 5A and the accompanying description below. In one or more embodiments, the computer processor (108) includes functionality to execute the local defect analysis (104) and the nonlocal flow detector (106).

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
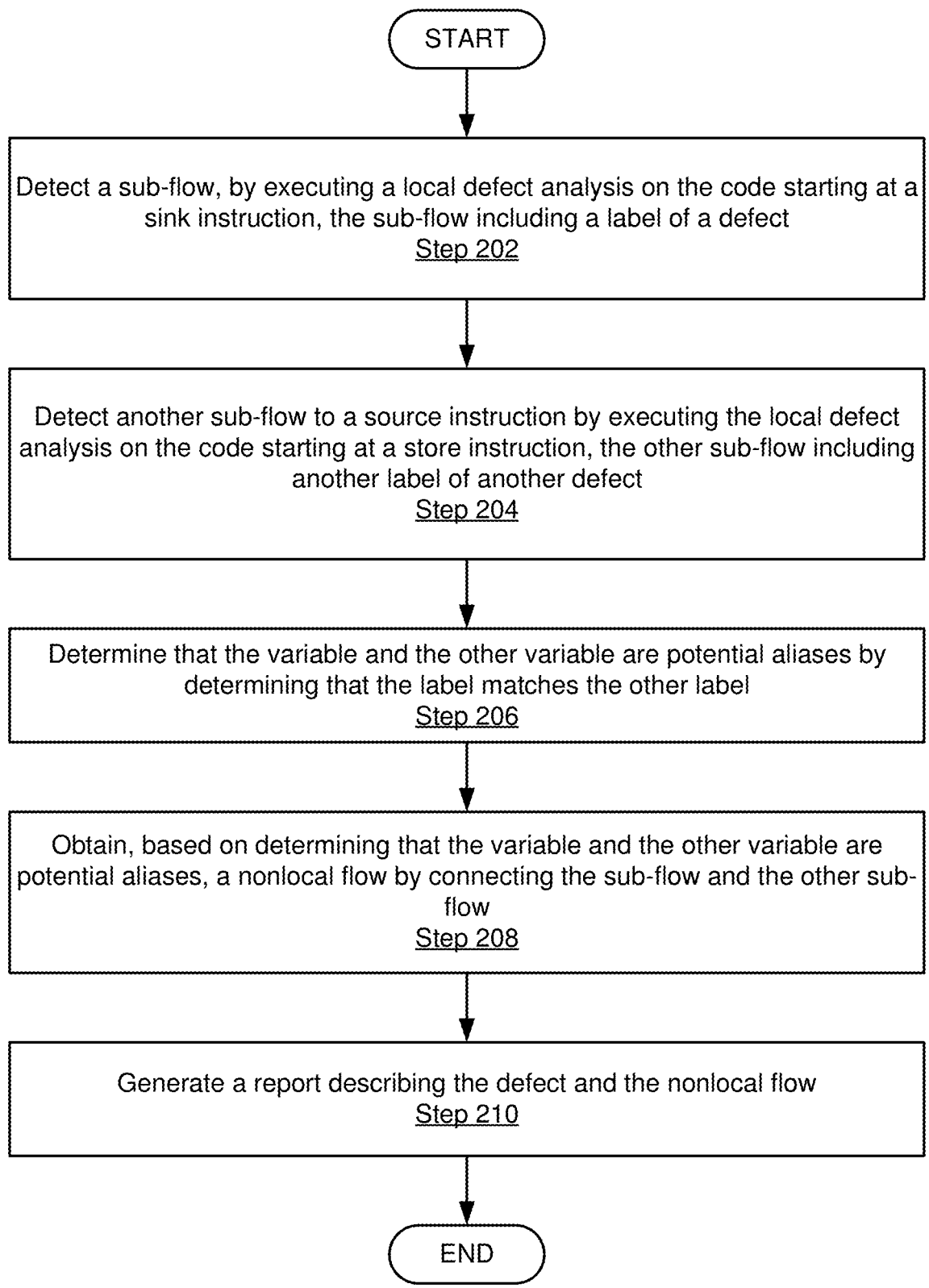
FIG. 2 and FIG. 3 show flowcharts in accordance with one or more embodiments of the invention.

FIG. 2 shows a flowchart in accordance with one or more embodiments of the invention. The flowchart depicts a process for executing a nonlocal defect analysis. One or more of the steps in FIG. 2 may be performed by the components (e.g., the nonlocal flow detector (106) and the local defect analysis (104) of the computer system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a sub-flow is detected, by executing a local defect analysis on the code starting at a sink instruction, to a load instruction performing: reading a value using a variable. For example, the local defect analysis may be modified to detect sub-flows from the sink instruction to the load instruction (e.g., instead of detecting flows from the sink instruction to a source instruction). The load instruction may read the value from a nonlocally accessible data structure (e.g., a database). The sub-flow may include one or more instructions that access the value, in addition to the sink instruction and the load instruction.

The local defect analysis may detect the sub-flow by propagating access paths to a series of instructions starting at the sink instruction until the load instruction is reached. That is, the local defect analysis may examine instructions in a backward manner, starting from the sink instruction until the load instruction is reached. When the local defect analysis encounters a call site, the analysis may be continued from the last instruction of the called function until the first instruction in the called function is reached.

The sub-flow includes a label of a defect. The local defect analysis may determine the label using the sink instruction. For example, the defect at the sink instruction may be "code injection" or "cross-site scripting." The local defect analysis may add the label to the sub-flow. The local defect analysis may add the label to the access path(s) corresponding to each instruction in the sub-flow.

In one or more embodiments, the local defect analysis determines that the sub-flow excludes any modifier instruction that modifies (e.g., sanitizes) the value before the variable in the sink instruction is used to read the value, where the modifier instruction corresponds to the defect.

The local defect analysis is independent of the order in which the instructions of the code are executed. For example, the execution of the instructions may be interleaved due to execution of different portions of the code in different threads or processes, without affecting the results of the local defect analysis.

In Step 204, another sub-flow to a source instruction is detected by executing the local defect analysis on the code starting at a store instruction performing: writing another value using another variable (see description of Step 202 above). For example, the local defect analysis may be modified to detect sub-flows from the store instruction to the source instruction. The store instruction may write the other value to a nonlocally accessible data structure. The sub-flow may include one or more instructions that access the other value, in addition to the store instruction and the source instruction. The local defect analysis may detect the other sub-flow by propagating access paths to a series of instructions starting at the store instruction until the source instruction is reached.

The other sub-flow includes another label of another defect. The local defect analysis may determine the other label using the source instruction. For example, the other defect at the source instruction may be "tainted data." The local defect analysis may add the other label to the other sub-flow. The local defect analysis may add the other label to the access path(s) corresponding to each instruction in the other sub-flow.

In one or more embodiments, the local defect analysis determines that the other sub-flow excludes any modifier instruction that modifies the other value before the other variable in the store instruction is used to write the other value, where the modifier instruction corresponds to the other defect.

In Step 206, it is determined that the variable and the other variable are potential aliases by determining that the label matches the other label. That is, the nonlocal flow detector may determine that the variable in the load instruction may access the same value as the other variable in the store instruction. In other words, a potentially defective value may flow from the store instruction to the load instruction. The nonlocal flow detector may determine that the label and the other label match when the label and the other label are the same. Alternatively, the nonlocal flow detector may determine that the label and the other label match using the defect map. For example, the defect map may indicate that a defect of the label is mapped to a defect of the other label, or vice versa. Continuing this example, the defect map may indicate that the defect "tainted data" is mapped to the defects "code injection" and "cross-site scripting."

By excluding sub-flows whose labels fail to match, the precision of the nonlocal analysis is improved (e.g., where precision is measured in terms of the number of false positive results).

The nonlocal flow detector may further determine that that the variable and the other variable are potential aliases by determining that an access path of the load instruction matches an access path of the store instruction. The nonlocal flow detector may determine that two access paths match when either:
  a. Each field identifier in the sequence of field identifiers of one access path matches a corresponding field identifier in the sequence of field identifiers of the other access path; or
  b. The sequence of field identifiers in the one access path is a prefix of the sequence of field identifiers in the other access path (e.g., the sequence of field identifiers in the access path subsumes the sequence of field identifiers in the other access path). For example, the access path $b.f_1.f_2$ is a prefix of the access path $b.f_1.f_2 \ldots f_n$, where b is a variable, and $f_1.f_2 \ldots f_n$ are field identifiers.

Determining that that the variable and the other variable are potential aliases by matching labels and access paths is an efficient technique for performing an approximate alias analysis. For example, limiting the nonlocal analysis to sub-flows whose access paths have matching labels reduces the computational complexity of the nonlocal analysis. In contrast, a full, complete nonlocal alias analysis is computationally expensive, and thus unscalable to large codebases. Experiments have shown that the disclosed approximate alias analysis technique performs well in practice, resulting in a minor additional computational overhead of 10%.

Prior to matching the access path and the other access path, the nonlocal flow detector may reify an access path in order to determine the full access path referenced by the access path. When the code is represented in an intermediate representation (IR) using static single assignment (SSA), instructions involving multiple stores and/or loads may be reified in order to determine the full access path. In one or more embodiments, using SSA, variables represented in the IR may be renamed such that each variable is assigned exactly once, and each variable is defined before it is used. For example, if it is possible to assign a variable x using a value coming from multiple instructions of the code (e.g., due to conditional branches in the code), then the variable x may be split into versions that are named $x_1, x_2, \ldots x_n$ to correspond with the various ways that x may be assigned a single value (i.e., exactly once). In this way each assignment of the variable x corresponds to its own version $x_i$. In one or more embodiments, requiring that each variable represented be assigned exactly once simplifies the tracing the flow of values among instructions of the code, since there is a unique path through the code corresponding to each variable assignment. Translation to an IR usually deconstructs field accesses into multiple sub-instructions using temporary variables that require reification before analysis. To address this issue, a reification step may be performed before processing a store or load instruction, in order to determine the full access path(s) referenced by the load or store instruction.

Figure 4A:
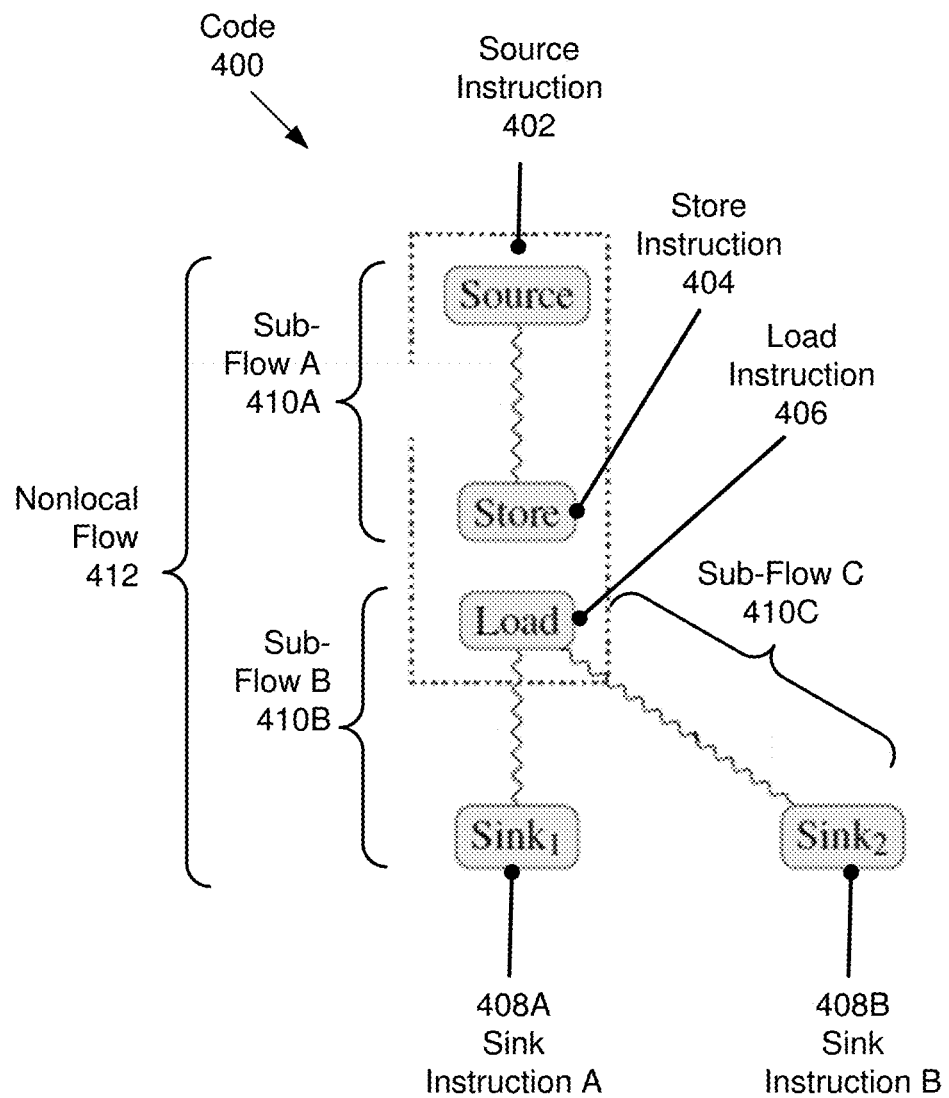
FIG. 4A and FIG. 4B show examples in accordance with one or more embodiments of the invention.

In Step 208, a nonlocal flow is obtained, based on determining that the variable and the other variable are potential aliases, by connecting the sub-flow and the other sub-flow. For example, the nonlocal flow may include both the sub-flow and the other sub-flow, where the load instruction of the sub-flow follows the store instruction of the other sub-flow. Continuing this example, FIG. 4A shows a store instruction (404) of sub-flow A (410A) and a load instruction (406) of sub-flow B (410B) that are connected in a nonlocal flow (412).

In Step 210, a report is generated describing the defect and the nonlocal flow. For example, the report may include the sequence of instructions in the nonlocal flow (e.g., the sequence of instructions in the sub-flow followed by the sequence of instructions in the other sub-flow). The nonlocal flow detector may send the report to an end-user or a developer.

Figure 3:
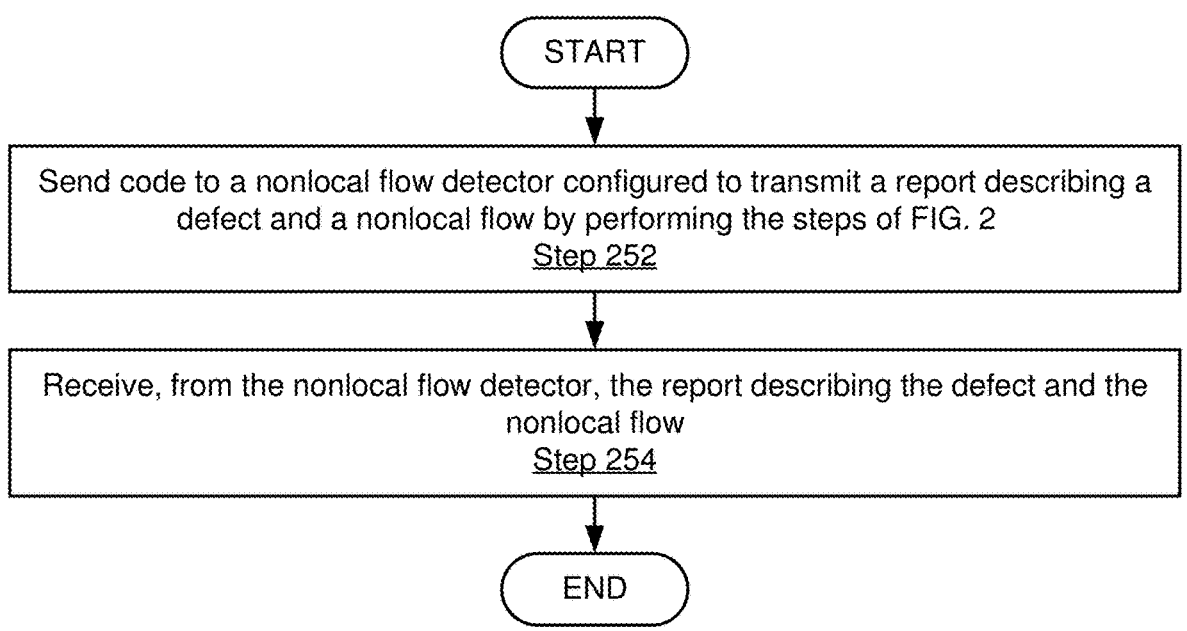

FIG. 3 shows a flowchart in accordance with one or more embodiments of the invention. The flowchart depicts a process for executing a nonlocal defect analysis. One or more of the steps in FIG. 3 may be performed by the components (e.g., the nonlocal flow detector (106) and the local defect analysis (104)) of the computer system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 252, code is sent to a nonlocal flow detector configured to transmit a report describing a defect and a nonlocal flow by performing the steps of FIG. 2. The code may be sent to the nonlocal flow detector via a network.

In Step 254, the report describing the defect and the nonlocal flow is received from the nonlocal flow detector. The report describing the defect and the nonlocal flow may be received from the nonlocal flow detector via the network.

Figure 4B:
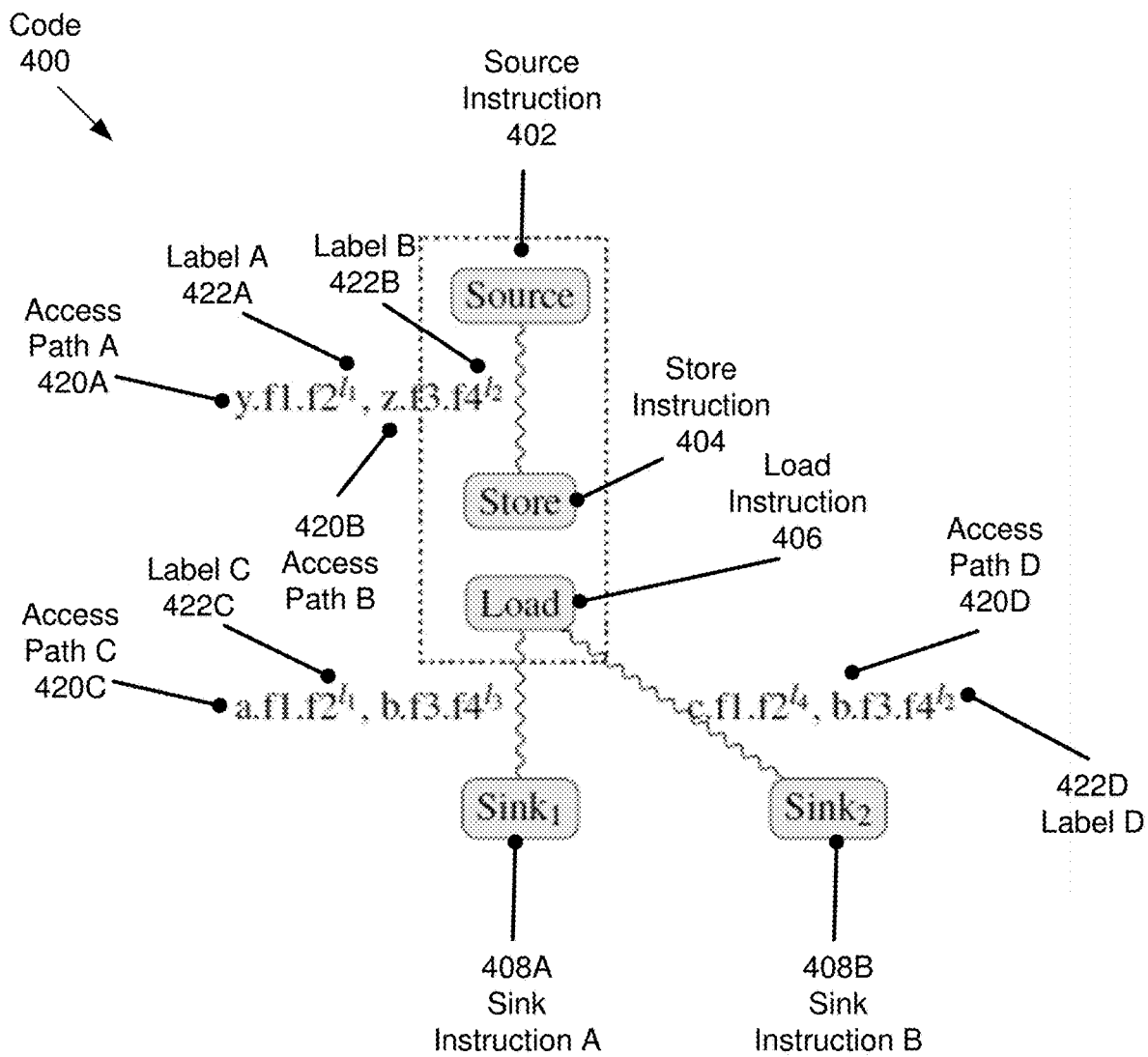

FIG. 4A and FIG. 4B show an implementation example in accordance with one or more embodiments. The implementation example is for explanatory purposes only and not intended to limit the scope of the invention. One skilled in the art will appreciate that implementation of embodiments of the invention may take various forms and still be within the scope of the invention.

FIG. 4A shows a diagram of code (400) ((110) in FIG. 1A) that includes instructions (402, 404, 406, 408A, 408B) ((112I, 112T, 112C, 112K, 112Q, 112X) in FIG. 1A and (150) in FIG. 1B). FIG. 4B shows access paths (420A, 420B, 420C, 420D) ((152J, 152R) in FIG. 1B) propagated by a local defect analysis among the instructions (402, 404, 406, 408A, 408B). In this case, the local defect analysis is a local taint analysis. The access paths (420A, 420B, 420C, 420D) include labels (422A, 422B, 422C, 422D) ((122A, 122B) in FIG. 1A and (122J) in FIG. 1B).

The local taint analysis begins a backward analysis of the code (400) and detects sub-flow B (410B) from sink instruction A (408A) to a load instruction (406) while propagating access path C (420C). Sink instruction A (408A) performs a security-sensitive operation and the load instruction (406) reads a value from a database using variable a, which is included in access path C (420C). The local taint analysis adds label C (422C) to both access path C (420C) and sub-flow B (410B). Label C (422C) indicates the defect "code injection."

The local taint analysis also detects sub-flow A (410A) from a store instruction (404) to a source instruction (402). The source instruction (402) receives a tainted value and the store instruction (404) writes the tainted value to the database using the variable y, which is included in access path A (420A). The local taint analysis adds label A (422A) to both access path A (420A) and sub-flow A (410A). Label A (422A) indicates the defect "code injection."

The nonlocal flow detector determines that variable a used in the load instruction (406) and variable y used in the store instruction (404) are potential aliases by determining that: 1) label C (422C) matches label A (422A), and 2) the field identifiers of access path C (420C) match the field identifiers of access path A (420A). The nonlocal flow detector then obtains nonlocal flow A (412A) by connecting sub-flow A (410A) and sub-flow B (410B) such that the load instruction (406) in sub-flow B (410B) follows the store instruction (404) in sub-flow A (410A).

The local taint analysis also detects sub-flow C (410C) from sink instruction B (408B) to the load instruction (406) while propagating access path D (420D). Sink instruction B (408B) performs a security-sensitive operation and the load instruction (406) reads a value from a database using variable b, which is included in access path D (420D). The local taint analysis adds label D (422D) to both access path D (420D) and sub-flow C (410C). Label D (422D) indicates the defect "cross-site scripting."

The local taint analysis also detects another sub-flow (not shown) from the store instruction (404) to the source instruction (402), where the store instruction (404) writes the tainted value to the database using the variable z, which is included in access path B (420B). The local taint analysis adds label B (422B) to both access path B (420B) and the other sub-flow. Label B (422B) indicates the defect "cross-site scripting."

The nonlocal flow detector determines that variable b used in the load instruction (406) and the variable z used in the store instruction (404) are potential aliases by determining that: 1) label D (422D) matches label B (422B), and 2) the field identifiers of access path D (420D) match the field identifiers of access path B (420B). The nonlocal flow detector then obtains another nonlocal flow by connecting the other sub-flow and sub-flow C (410C) such that the load instruction (406) in sub-flow C (410C) follows the store instruction (404) in the other sub-flow.

Note that sink instruction A (408A) corresponds to an access path b.f3.f4 whose label $l_3$ failed to match any label in an access path of any sub-flow, and thus access path b.f3.f4 did not contribute to a nonlocal flow. Similarly, sink instruction B (408B) corresponds to an access path c.f1.f2 whose label 14 failed to match any label in an access path of any sub-flow, and thus access path c.f1.f2 did not contribute to a nonlocal flow.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
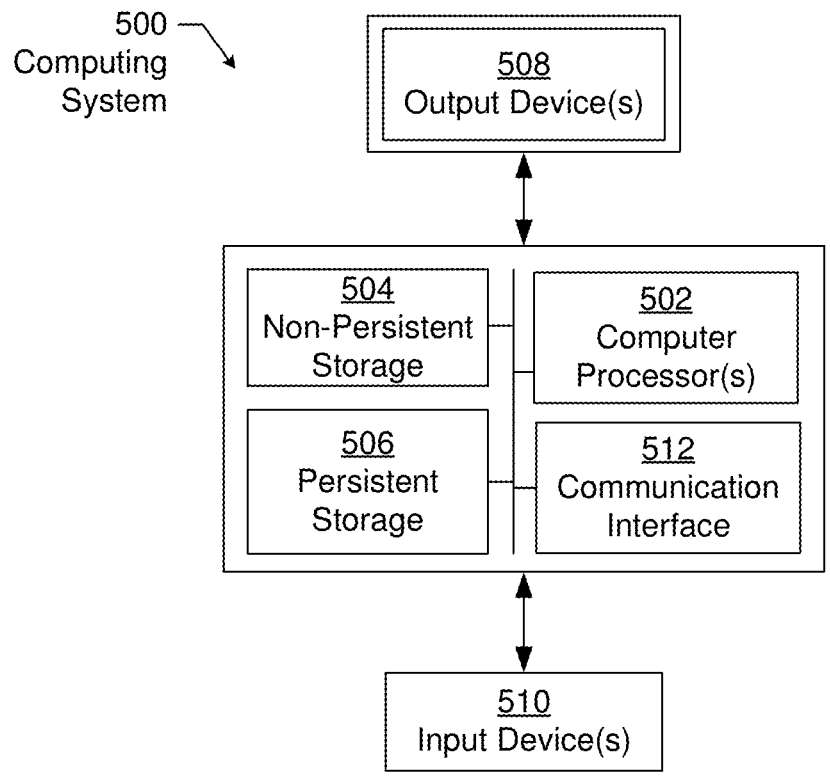
FIG. 5A and FIG. 5B show computing systems in accordance with one or more embodiments of the invention.
Figure 5B:
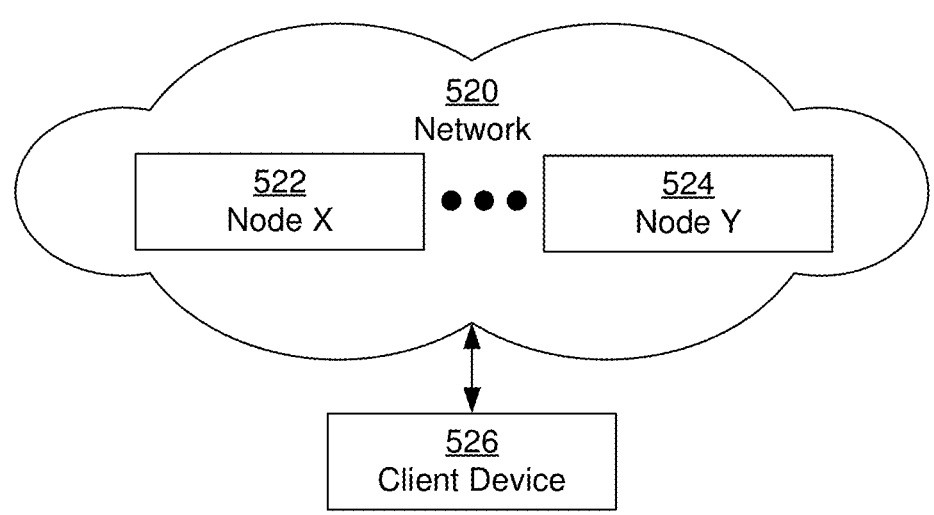

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing a nonlocal defect analysis on code, comprising:
    propagating, through the code, a first access path to a first series of instructions starting at a sink instruction until a load instruction is reached to identify a first sub-flow, the first access path comprising a first sequence of field identifiers,
        wherein the sink instruction uses a first value of a first variable,
        wherein the load instruction reads the first value using the first variable from a nonlocally accessible data structure, and
        wherein the first sub-flow comprises a first label of a first defect;
    propagating, through the code, a second access path to a second series of instructions starting at a store instruction until a source instruction is reached to identify a second sub-flow, the second access path comprising a second sequence of field identifiers,
        wherein the store instruction writes a second value using a second variable to the nonlocally accessible data structure, and
        wherein the second sub-flow comprises a second label of a second defect;
    comparing, to obtain a match, the first label with the second label and comparing each field identifier in the first access path with a corresponding field identifier in the second access path, the match indicating that the first variable and the second variable are potential aliases referring to a same value in the nonlocally accessible data structure; and
    generating a nonlocal flow connecting the first sub-flow and the second sub-flow responsive to the match wherein sub-flows comprising labels failing to match are excluded from nonlocal flow analysis.

2. The method of claim 1, further comprising:
    generating a report describing the first defect and the nonlocal flow.

3. The method of claim 1, further comprising determining that the first sequence of field identifiers is a prefix of the second sequence of field identifiers.

4. The method of claim 1, further comprising:
    determining the first label using the sink instruction;
    in response to determining the first label, adding the first label to the first sub-flow;
    determining the second label using the source instruction; and
    in response to determining the second label, adding the second label to the second sub-flow.

5. The method of claim 1,
    wherein propagating the first access path is part of a taint analysis, and
    wherein the first label and the second label are selected from a group consisting of code injection and cross-site scripting.

6. The method of claim 1, further comprising:
    determining that the first sub-flow excludes a modifier instruction performing: modifying the first value before the first variable reads the first value, wherein the modifier instruction corresponds to the first defect.

7. A system for executing a nonlocal defect analysis on code, comprising:
    a computer processor;
    a repository configured to store the code comprising a sink instruction, a source instruction, a load instruction, and a store instruction,
        wherein the sink instruction uses a first value of a first variable,
        wherein the load instruction reads the first value using the first variable from a nonlocally accessible data structure, and
        wherein the store instruction writes a second value using a second variable to the nonlocally accessible data structure; and a nonlocal flow detector, executing on the computer processor and configured to:
propagate, through the code, a first access path to a first series of instructions starting at the sink instruction until the load instruction is reached to identify a first sub-flow, the first access path comprising a first sequence of field identifiers,
wherein the first sub-flow comprises a first label of a first defect, propagate, through the code, a second access path to a second series of instructions starting at the store instruction until the source instruction is reached to identify a second sub-flow, the second access path comprising a second sequence of field identifiers,
wherein the second sub-flow comprises a second label of a second defect,
compare, to obtain a match, the first label and the second label and compare each field identifier in the first access path with a corresponding field identifier in the second access path, the match indicating that the first variable and the second variable are potential aliases referring to a same value in the nonlocally accessible data structure, and
generate a nonlocal flow connecting the first sub-flow and the second sub-flow responsive to the match,
wherein sub-flows comprising labels failing to match are excluded from nonlocal flow analysis.

8. The system of claim 7, wherein the nonlocal flow detector is further configured to:
generate a report describing the first defect and the nonlocal flow.

9. The system of claim 7, wherein the nonlocal flow detector is further configured to determine that the first sequence of field identifiers is a prefix of the second sequence of field identifiers.

10. The system of claim 7, wherein the nonlocal flow detector is further configured to:
determine the first label using the sink instruction;
in response to determining the first label, add the first label to the first sub-flow;
determine the second label using the source instruction; and
in response to determining the second label, add the second label to the second sub-flow.

11. The system of claim 7,
wherein propagating the first access path is part of a taint analysis, and
wherein the first label and the second label are selected from a group consisting of code injection and cross-site scripting.

12. The system of claim 7, wherein the nonlocal flow detector is further configured to:
determine that the first sub-flow excludes a modifier instruction performing: modifying the first value before the first variable reads the first value, wherein the modifier instruction corresponds to the first defect.

13. A method for executing a nonlocal defect analysis on code, comprising:
propagating, through the code, access paths to a first series of instructions starting at a sink instruction until a load instruction is reached to identify a first sub-flow,
wherein the sink instruction uses a first value of a first variable,
wherein the load instruction reads the first value using the first variable from a nonlocally accessible data structure, and
wherein the first sub-flow comprises a first label of a first defect added to the first sub-flow, the first label identified using the sink instruction,
propagating, through the code, access paths to a second series of instructions starting at a store instruction until a source instruction is reached to identify a second sub-flow,
wherein the store instruction writes a second value using a second variable to the nonlocally accessible data structure, and
wherein the second sub-flow comprises a second label of a second defect added to the second sub-flow, the second label identified using the source instruction,
comparing the first label and the second label to obtain a match indicating that the first variable and the second variable are potential aliases referring to a same value in the nonlocally accessible data structure,
generating a nonlocal flow connecting the first sub-flow and the second sub-flow responsive to the match,
wherein sub-flows comprising labels failing to match are excluded from nonlocal flow analysis.

14. The method of claim 13,
wherein the load instruction corresponds to a first access path,
wherein the store instruction corresponds to a second access path, and
wherein the method further comprises determining that the first access path matches the second access path.

15. The method of claim 14,
wherein the first access path comprises a first sequence of field identifiers,
wherein the second access path comprises a second sequence of field identifiers, and
wherein the method further comprises:
determining that each field identifier in the first access path matches a corresponding field identifier in the second access path, and
determining that the first sequence of field identifiers is a prefix of the second sequence of field identifiers.

* * * * *